United States Patent
Kim et al.

(10) Patent No.: US 7,275,561 B2
(45) Date of Patent: Oct. 2, 2007

(54) DISCHARGING VALVE ASSEMBLY OF RECIPROCATING COMPRESSOR

(75) Inventors: Kwang-Wook Kim, Seoul (KR); Jin-Dong Kim, Gyeonggi-Do (KR); Gye-Young Song, Gyeonggi-Do (KR); Jeong-Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 10/697,887

(22) Filed: Oct. 31, 2003

(65) Prior Publication Data
US 2005/0092374 A1  May 5, 2005

(51) Int. Cl.
*F16K 15/02* (2006.01)
(52) U.S. Cl. .................. 137/543.17; 251/337; 417/571
(58) Field of Classification Search ........... 137/543.17; 251/337; 417/312, 569, 570, 571
See application file for complete search history.

(56) References Cited

U.S. PATENT DOCUMENTS

| | | | | |
|---|---|---|---|---|
| 1,852,033 A | * | 4/1932 | Summers | 137/857 |
| 3,456,684 A | * | 7/1969 | Sochting | 137/543.17 |
| 5,123,819 A | * | 6/1992 | Schuller et al. | 417/569 |
| 6,968,858 B2 | * | 11/2005 | Kuehn et al. | 137/539.5 |
| 2002/0012595 A1 | | 1/2002 | Kouno et al. | |
| 2002/0150488 A1 | * | 10/2002 | Lee et al. | 417/569 |

FOREIGN PATENT DOCUMENTS

| | | |
|---|---|---|
| DE | 75 13 261 | 10/1976 |
| DE | 7513261 | * 10/1976 |
| DE | 101 15 856 C1 | 8/2002 |

* cited by examiner

*Primary Examiner*—Ramesh Krishnamurthy
(74) *Attorney, Agent, or Firm*—Birch, Stewart, Kolasch & Birch, LLP

(57) ABSTRACT

A discharging valve assembly for a reciprocating compressor includes a discharging cover coupled with a front frame so as to cover a cylinder in which a piston is inserted; a discharging valve inserted in the discharging cover, and opening/closing an inner space of the cylinder where gas is compressed; and an unbalancedly and elastically supporting means elastically supporting the discharging valve so that contact pressure applied to the discharging valve when the valve comes in contact with the contact surface of the cylinder is unbalanced. Accordingly, the discharging valve assembly can improve discharging efficiency of gas compressed in the cylinder and discharged, and can minimize noise generated when the discharging valve comes in contact with the cylinder while moving.

5 Claims, 7 Drawing Sheets

DISCHARGING VALVE ASSEMBLY OF RECIPROCATING COMPRESSOR

BACKGROUND OF THE INVENTION

1. Field of the Invention

The present invention relates to a discharging valve assembly of a reciprocating compressor, and more particularly, to a discharging valve assembly of a reciprocating compressor capable of improving discharging efficiency of gas compressed in a cylinder and discharged as well as minimizing noise generation.

2. Description of the Background Art

In general, a reciprocating compressor is an apparatus for sucking and compressing refrigerant gas while a piston linearly and reciprocally moves in a cylinder. A reciprocating compressor is largely divided into two methods according to a driving mechanism. One is a method of converting a rotational movement into a linearly reciprocating movement, and transmitting the linearly reciprocating movement to a piston. The other one is a method of directly transmitting a linearly reciprocating movement of a motor to a piston.

FIG. 1 is a view showing one example of a reciprocating compressor. As shown therein, the reciprocating compressor includes a casing 10 coupled with a gas suction pipe 1 and with a gas discharging pipe 2; a front frame 20 and a middle frame 30 installed at a certain interval therebetween in the casing 10, and elastically supported by springs (not shown); a driving motor 40 mounted between the front frame 20 and the middle frame 30, and generating a linearly reciprocating driving force; a cylinder 50 inserted in the front frame 20; a piston 60 received the driving force of the driving motor 40, and thus linearly and reciprocally moved in the cylinder 50; a rear frame 70 covering the piston 60; a resonant spring 80 elastically supporting the piston 60 and inducing a resonant movement of the piston 60; a suction valve 90 coupled with an end surface of the piston 60, and controlling flow of gas introduced into the cylinder 50 according to linearly reciprocating movement of the piston 60; and a discharging valve assembly 100 installed one side of the cylinder 50, and controlling discharge of gas compressed in the cylinder 50 according to the linearly reciprocating movement of the piston 60.

The driving motor 40 includes an outer stator 41 mounted between the front frame 20 and the middle frame 30; an inner stator 42 inserted in the outer stator 41, and mounted at the front frame 20; a winding coil 43 coupled with the outer stator 41; and a movable unit 44 inserted between the outer stator 41 and the inner stator 42 so as to be linearly movable. The movable unit 44 includes a cylindrical holder 45 and a plurality of magnets 46 coupled with the holder 45, and the holder 45 is connected with the piston 60.

The discharging valve assembly 100 includes a discharging cover 101 for covering an inner space of the cylinder 50; a discharging valve 102 positioned in the discharging cover 101, and opening/closing the inner space of the cylinder; and a valve spring 103 elastically supporting the discharging valve 102. The gas discharging pipe is connected to the discharging cover.

items 104, and 105, which are not explained above, are a coupling bolt and a nut, respectively.

Operations of the reciprocating compressor as above will now be described.

First, when power is applied to the compressor, a linearly reciprocating driving force is generated at the driving motor 40, and thus the movable unit 44 of the driving motor is linearly and reciprocally moved. The linearly reciprocating movement of the movable unit 44 is transmitted to the piston 60, and thus the piston 60 is linearly and reciprocally moved at the inner space of the cylinder 50. According to the linearly reciprocating movement of the piston 60 at the inner space of the cylinder 50, while the suction valve 90 and the discharging valve assembly 100 open/close a gas channel by a pressure difference generated in the cylinder 59, gas is sucked into the cylinder 50, compressed, and discharged. The gas compressed at and discharged from the inner space of the cylinder 50 is discharged outside of the casing 10 by way of the inside of a discharging cover 101 and through the gas discharging pipe 2. This process above is continuously repeated so that gas can be compressed.

In the reciprocating compressor, a degree of noise generation is affected by operations of the discharging valve assembly 100 for discharging gas compressed by the linearly reciprocating movement of the piston 50. In addition, by operations of the discharging valve 100, flow resistance of discharged gas is affected, and thus a discharge amount of gas. Accordingly, a study of the discharging valve assembly 100 is an important factor to increasing reliability and efficiency, and so many studies are in progress.

FIG. 2 is view showing one example of a conventional construction of a discharging valve assembly for the reciprocating compressor. As shown therein, the discharging valve assembly for the conventional reciprocating compressor includes a discharging cover 110 for covering the inner space of the cylinder 50; a discharging valve 120 inserted in the discharging cover 110, and opening/closing the inner space of the cylinder 50; and a valve spring 130 for elastically supporting the discharging valve 120. The discharging cover 110 is formed in a cap shape having a certain thickness. That is, the discharging cover 110 is provided with a fixing unit 112 bent and extended at one side of a cylindrical portion 111 having a certain length and an outer diameter, and coupled with the front frame 20; a discharging hole 113 coupled with the gas discharging pipe 2 at one side of the cylindrical portion 111; and a supporting wall portion 115 formed at the other side of the cylindrical portion 111, covering the cylindrical portion 111. The supporting wall portion 115 vertically meets the cylindrical portion 111.

The discharging valve 120 is provided with a spring coupling portion 122 protruded at one side of a hemisphere 121, and a round compression plane 123 closing the inner space of the cylinder 50, and formed at the other side of the body portion 121.

The valve spring 130 is a coil spring having a certain length.

One side of the valve spring 130 is coupled with the spring coupling portion 122 of the discharging valve, and the other side thereof is contactedly supported by an inner surface 114 of the supporting wall portion of the discharging cover 110. At this time, the compression plane 123 of the discharging valve is in contact with a contact surface S1, an end surface of the cylinder 50. The inner surface 114 of the supporting wall portion of the discharging cover being in contact with the valve spring 130, is a plane, which is in parallel with the contact surface S1 of the cylinder 50 being in contact with the compression plane 123 of the discharging valve.

Operations of a discharging valve assembly for the conventional reciprocating compressor as above will now be described in detail.

As shown in FIG. 3, when the piston 60 moves from a top dead point to a bottom dead point, the compression plane 123 of the discharging valve is adhered to the contact surface S1 of the cylinder 50 by a pressure difference at the inner surface of the cylinder 50. Simultaneously with this adhesion, the suction valve 90 is opened, and thus gas is introduced into the inner space of the cylinder 50 through a channel formed in the piston 60.

As shown in FIG. 4, when the piston 60 moves from a bottom dead potion to a top dead point, the suction valve 90 closes the gas channel of the piston 60, and thus gas sucked into the inner space of the cylinder 50 is gradually compressed. When the gas is in a predetermined compression state, the discharging valve 120 supported at the valve spring 130 is opened, and thus the compressed gas is discharged. This process is continuously repeated so that gas can be compressed.

In the discharging valve assembly as above, shapes of the inner space of the cylinder 50 for discharging gas and a discharging valve 90 for opening/closing the inner space of the cylinder 50 are formed so as to have a maximum discharging area. For this reason, flow of discharged gas is smooth, and efficiency is excellent since a great amount of gas is discharged at a time.

However, elastic stiffness of the valve spring 130 elastically supporting the discharging valve 120 is designed to be weak in order to make a movement of the discharging valve 120 smooth. So, as the discharging valve 120 is moved, the moving width thereof becomes greater, and thus an impulse generated when the valve 120 comes in contact with the cylinder 50 is increased whereby a valve contact noise of a high frequency band is greatly generated.

SUMMARY OF THE INVENTION

Therefore, an object of the present invention is to provide a discharging valve assembly for a reciprocating compressor capable of minimizing noise generation as well as increasing discharging efficiency of gas compressed in the cylinder and then discharged.

To achieve these and other advantages and in accordance with the purpose of the present invention, as embodied and broadly described herein, there is provided a discharging valve assembly for a reciprocating compressor including a discharging cover coupled with a front frame so as to cover a cylinder in which a piston is inserted; a discharging valve inserted in the discharging cover and opening/closing an inner space of the cylinder where gas is compressed; and an unbalancedly and elastically supporting means elastically supporting the discharging valve so that contact pressure applied to the discharging valve when the discharging valve comes in contact with the cylinder is unbalanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
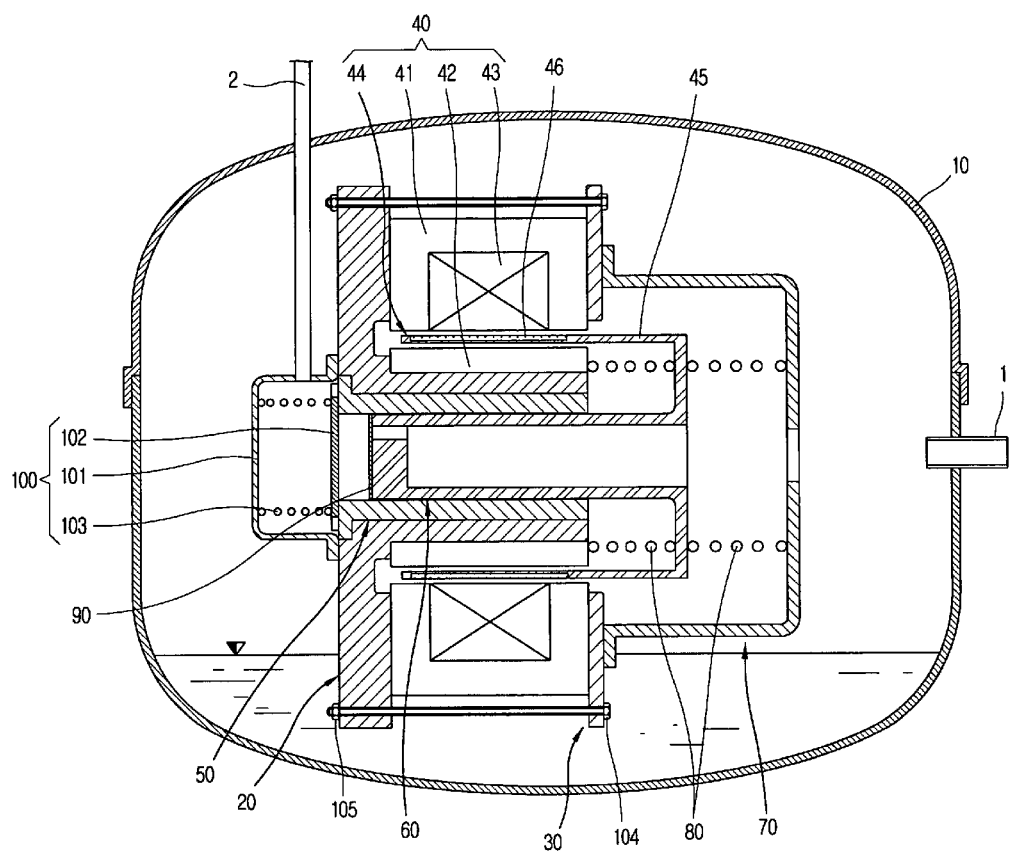
FIG. 1 is a sectional view showing a general reciprocating compressor.
Figure 2:
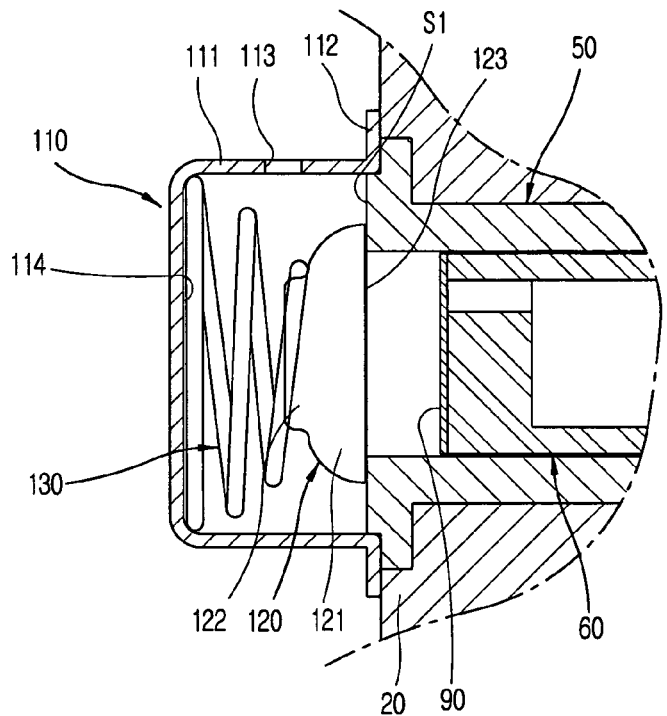
FIG. 2 is a sectional view showing a discharging valve assembly for the conventional reciprocating compressor.
Figure 3:
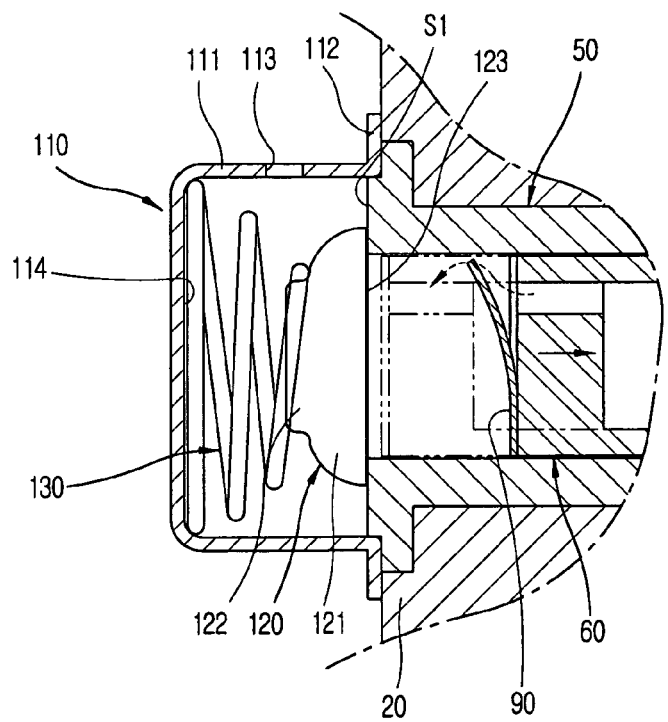
FIGS. 3 and 4 are sectional views showing operation states of a discharging valve assembly for the conventional reciprocating compressor respectively.
Figure 4:
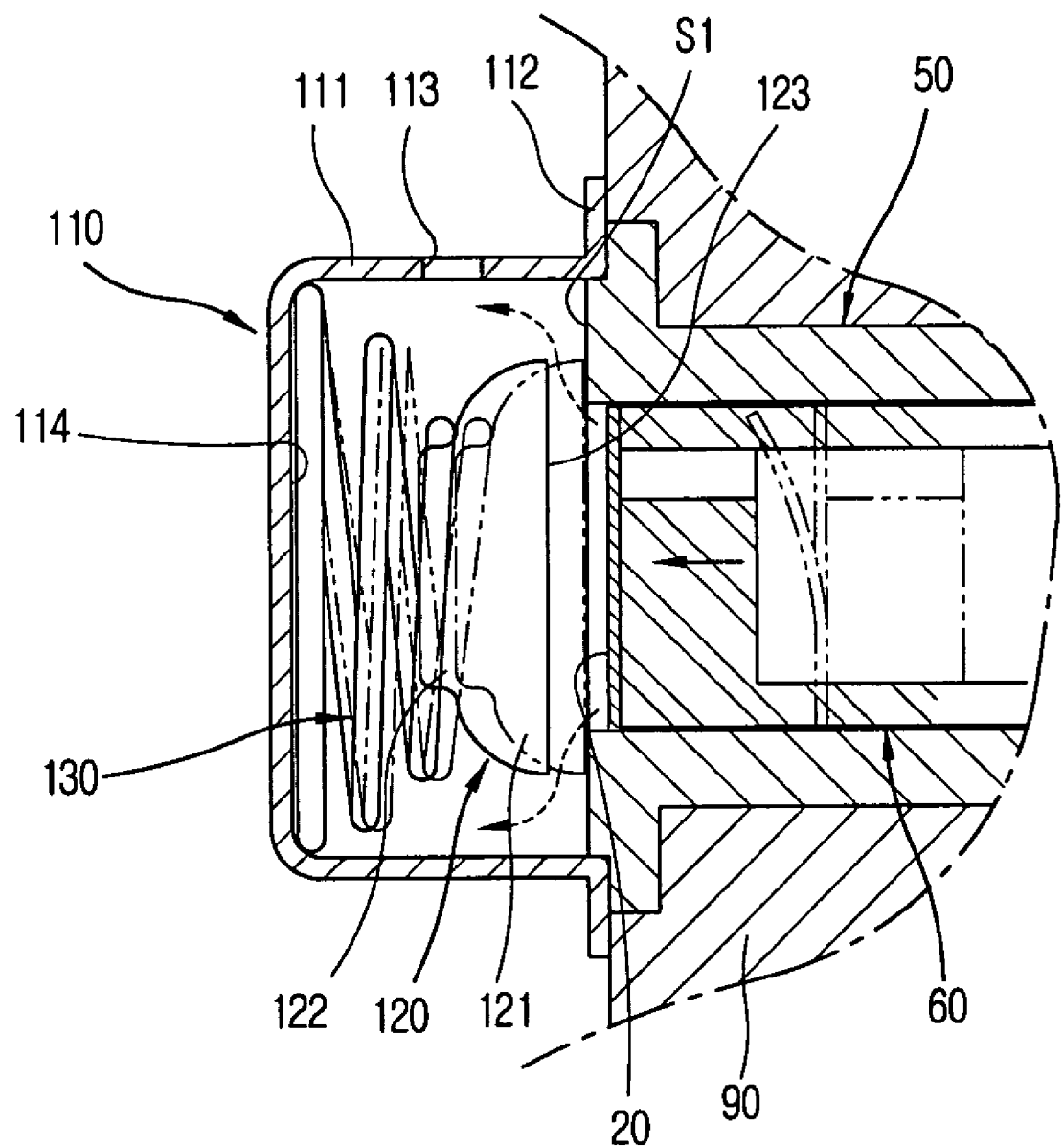
Figure 5:
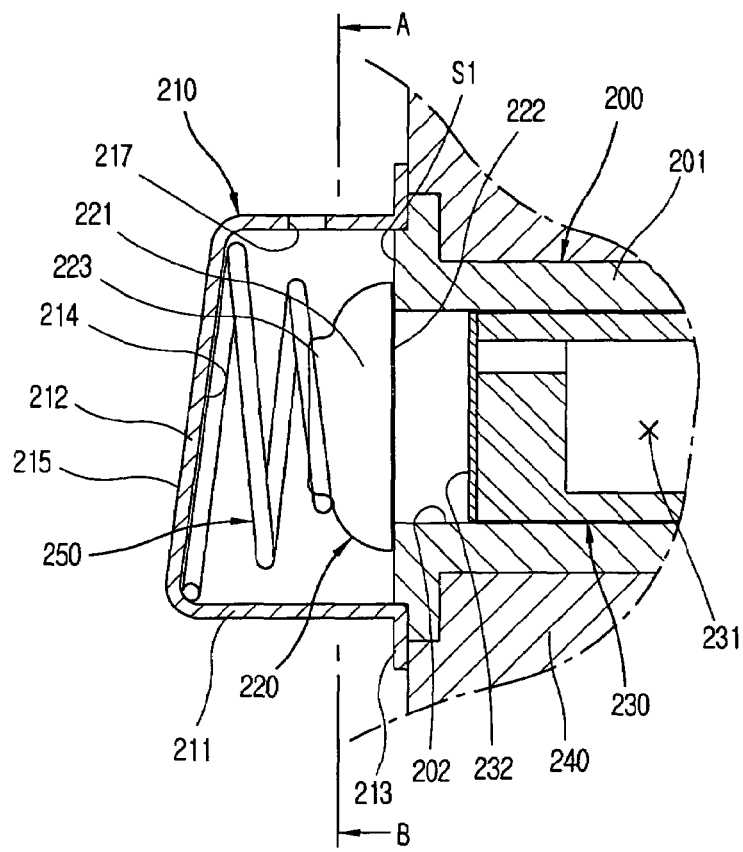
FIG. 5 is a sectional view showing one embodiment of a discharging valve assembly for a reciprocating compressor according to the present invention.
Figure 6:
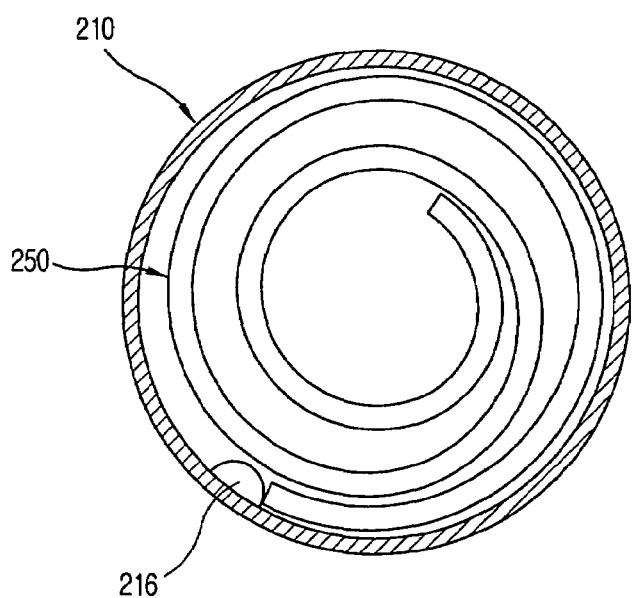
FIG. 6 is a sectional view taken along line A-B of FIG. 5.

FIG. 5 is a sectional view showing one embodiment of a discharging valve assembly for a reciprocating compressor according to the present invention, and FIG. 6 is a sectional view taken along line A-B of FIG. 5.

As shown therein, a discharging valve assembly of a reciprocating compressor includes a discharging cover 210 coupled with a front frame so as to cover a cylinder 200; a discharging valve 220 inserted in the discharging cover 210, and opening/closing an inner space of the cylinder 200 where gas is compressed; and an unbalancedly and elastically supporting means elastically supporting the discharging valve 220 so that contact pressure applied to the discharging valve 220 when the discharging valve 220 comes in contact with a contact surface S1 of the cylinder 200, is unbalanced.

In the cylinder 200, an inserting hole 202 in which a piston 230 is inserted is formed in a body portion 201 formed in a cylindrical shape, and a contact surface S1 being in contact with the discharging valve 220 is formed at one side surface of the body portion 201. The cylinder 200 is coupled with the frame 240, and a piston 230 is inserted in the inserting hole 202 of the cylinder so as to be linearly and reciprocally movable.

The piston 230 is provided with a gas channel 231 formed therein so as to pass through the piston 230, and a suction valve 232 mounted at one side end thereof to open/close the gas channel 231.

The discharging cover 210 includes a cylindrical portion 211 with a certain thickness and a predetermined length; a supporting wall portion 212 covering one side of the cylindrical portion 211; and a fixing portion 213 bent and extended at the other side of the cylindrical portion 211. An inner surface of the supporting wall portion 212 is formed so as to be a sloping surface 214 at a predetermined angle. The fixing unit 213 of the discharging cover 210 is coupled with the frame 240 so as to cover the contact surface S1 side of the cylinder.

The discharging valve 220 is formed in a hemispherical shape, and a plane of the hemisphere 221 is a compression plane 222 being in contact with the contact surface S1 of the cylinder. At the opposite side of the compression plane 222, a coupling portion 223 protruded from the hemisphere 221 is formed. The discharging valve 220 is in contact with the contact surface S1 of the cylinder so that its compression plane 222 can close the inner space of the cylinder 200.

The unbalancedly and elastically supporting means includes: a valve spring 250 whose one side is coupled with the coupling portion 223 of the discharging valve 220, and whose other side is contactedly supported by an inner surface of the supporting wall portion 212 of the discharging cover 210, having the different number of windings at its both sides from the center; and an inner surface of the supporting wall portion 212 of the discharging cover, that is, a sloping surface 214 where the valve spring 250 is supported.

The inner side surface of the discharging cover 210, that is, the sloping surface 214 slopes on the basis of the contact surface S1 of the cylinder where the discharging valve 220 is in contact, and the sloping angle is more than four degrees. The thickness of the supporting wall portion 212 forming the discharging valve 210 is constant, the supporting wall portion 212 is slopes on the basis of the contact surface S1 of the cylinder. At this time outer surface 215 of the supporting wall portion 212 is also slopes on the basis of the contact surface S1 of the cylinder.

The valve spring 250 is a coil spring, and the coil spring is formed in a conical shape. When producing the coil spring, the conical coil spring is wound so that its starting portion and its ending portion are overlapped with each other. Therefore, the number of windings at a side of the coil where the ending portion and the starting portion of the coil are positioned is different with the number of windings at the opposite side thereof. In the valve spring 250, elastic stiffness is smaller at the side with a larger number of windings than at the side with a smaller number of windings.

When one side of the valve spring 250 is coupled with the coupling portion 223 of the discharging valve and its other side is contactedly supported by the sloping surface 214 of the discharging cover, a side of the valve spring 250 with a larger number of windings, that is, with smaller elastic stiffness, is positioned at a sloping surface 214 side having a furthest distance from the contact surface S1 of the cylinder; and a side of the valve spring 250 with a smaller number of windings, that is, with greater elastic stiffness is positioned at a sloping surface 214 side having a nearest distance from the contact surface S1 of the cylinder. At this time, in the discharging valve 220 elastically supported by the valve spring 250 and thus pressed to the contact surface S1 of the cylinder, low pressure is applied to a portion of the discharging valve 220 supported by the side of the valve spring 250 with smaller elastic stiffness, and high pressure is applied to its opposite portion of the discharging valve 220 supported by the other side of the valve spring 250 with greater elastic stiffness.

A rotation preventing protrusion 216 for preventing rotation of the valve spring 250 is formed at the sloping surface 214 of the discharging cover by which the valve spring 250 is supported. The end of the coil of the valve spring 250 is positioned at the rotation preventing protrusion 216.

As a modification example, a cylindrical coil spring may be used for a valve spring. Elastic stiffness of the cylindrical coil spring is different at its both sides on the basis of the center. That is, a starting portion of the coil of the cylindrical coil spring and its ending portion are overlapped with each other, and so the number of windings is larger at a side where the starting portion of the coil and the ending portion of the coil are overlapped, than at its opposite side. At this time, the side of the spring with a larger number of windings has smaller elastic stiffness, and the other side of the spring with a smaller number of windings has greater elastic stiffness.

A discharging hole 217 through which gas is discharged outside of a casing, is formed at the cylindrical portion 211 of the discharging cover. At one side of the cylindrical portion 211 at which the discharging hole 217 is formed, a distance between the contact surface S1 of the cylinder and the sloping surface 214 of the discharging cover is the nearest. For this reason, a flow of gas discharged through the discharging hole 217 is smooth.

Figure 7:
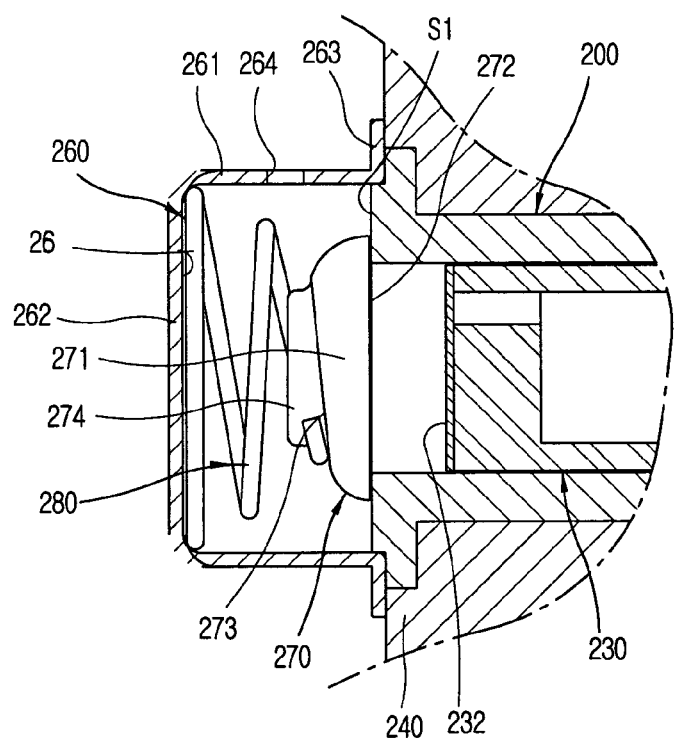
FIG. 7 is a sectional view showing another embodiment of a discharging valve assembly for a reciprocating compressor according to the present invention.

FIG. 7 is a sectional view showing another embodiment of a discharging valve assembly for a reciprocating compressor according to the present invention. In this drawing, the same portions as the embodiment above are given the same numeral.

Another embodiment of a discharging valve assembly for a reciprocating compressor will now be described with reference to FIG. 7.

A piston 230 is inserted in a cylinder 200 coupled with the frame 240, and a discharging cover 260 is coupled with the frame 240 so as to cover one side of the cylinder 200.

The discharging cover 260 includes a cylindrical portion 261 with a certain thickness and a predetermined length; a supporting wall portion 262 covering one side of the cylindrical portion 261; and a fixing portion 263 bent and extended at the other side of the cylindrical portion 261. The supporting wall portion 262 has a certain thickness and meets the cylindrical portion 261 vertically. A discharging hole 264 through which gas is discharged is formed at one side of the cylindrical portion 261. The fixing portion 263 of the discharging cover 260 is coupled with the frame 240 so as to cover the contact surface S1, which is an one side surface of the cylinder 200. At this time, an inner surface 265 of the supporting wall portion of the discharging cover and a contact surface S1 of the cylinder are positioned to be in parallel with each other.

And, a discharging valve 270 for opening/closing an inner space of the cylinder 200 is inserted in the discharging cover 260. The discharging valve 270 has a hemispherical shape, and a plane of the hemisphere is a compression plane 272 being in contacting with the contact surface S1 of the cylinder. A sloping surface 273 having a predetermined area is formed at the opposite side of the compression plane 272 of the hemisphere 271, and a protrusion portion 274 protruded at the center of the sloping surface 273 is formed. The sloping surface 273 of the discharging valve slopes on the basis of the compression plane 272 of the discharging valve, which is in contact with the contact surface S1 of the cylinder, and the sloping angle is more than four degrees. The discharging valve 270 is inserted so that its compression plane 272 is in contact with the contact surface S1 of the cylinder.

A valve spring 280 for elastically supporting the discharging valve 270 is coupled with the inside of the discharging cover 260. One side of the valve spring 280 is supported by an inner side surface 265 of the discharging cover, and its other side is coupled with the protrusion portion 274 and, at the same time, is contactedly supported by the sloping surface 273.

The valve spring 280 is a coil spring, which has different elastic stiffness at its both sides on the basis of the center. As stated above, the valve spring 280 is a conical coil spring or a cylindrical coil spring.

When the one side of the valve spring 280 is supported by the inner side surface 265 of the discharging cover, and its other side is coupled with the discharging valve 270, a side of the valve spring 280 with smaller elastic stiffness is positioned at the sloping surface 273 side having the nearest distance from the compression plane 272 of the discharging valve 270, and the other side of the valve spring 280 with greater elastic stiffness is positioned at the opposite side thereof. At this time, in the discharging valve 270 elastically supported by the valve spring 250 and thus pressed to the contact surface S1 of the cylinder, low pressure is applied to a portion of the discharging valve 220 supported by the side of the valve spring 250 with smaller elastic stiffness, and high pressure is applied to its opposite portion supported by the other side of the valve spring 250 with greater elastic stiffness.

A rotation preventing protrusion for preventing rotation of the valve spring is formed at one side of the inner side surface of the discharging cover or at the one side of the sloping surface of the discharging valve.

The discharging hole 264 is formed at one side of the discharging cover 210 having a nearest distance between the sloping surface of the discharging valve and the compression plane of the discharging valve.

Hereinafter, operation effect of the discharging valve assembly for the reciprocating compressor will now be described.

Figure 8:
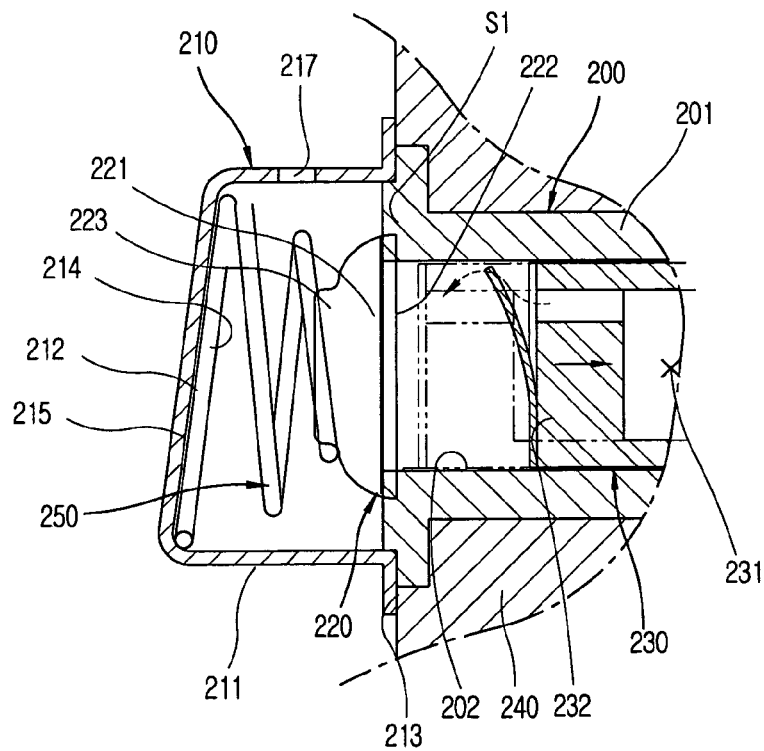
FIGS. 8 and 9 are sectional views showing operation states of a discharging valve assembly for a reciprocating compressor according to the present invention.

A driving force of a driving motor is transmitted to the piston 230, and thus the piston 230 is linearly and reciprocally moved in the cylinder 200. At this time, when the piston 230 is moved from the upper dead point to the bottom dead point, as shown in FIG. 8, the compression plane 222 of the discharging valve is adhered to the contact surface S1 of the cylinder by a pressure difference at the inner space of the cylinder 200. At the same time, a suction valve 232 is opened and thus gas is introduced into the inner space of the cylinder 200 through a gas channel of the piston 230.

Figure 9:
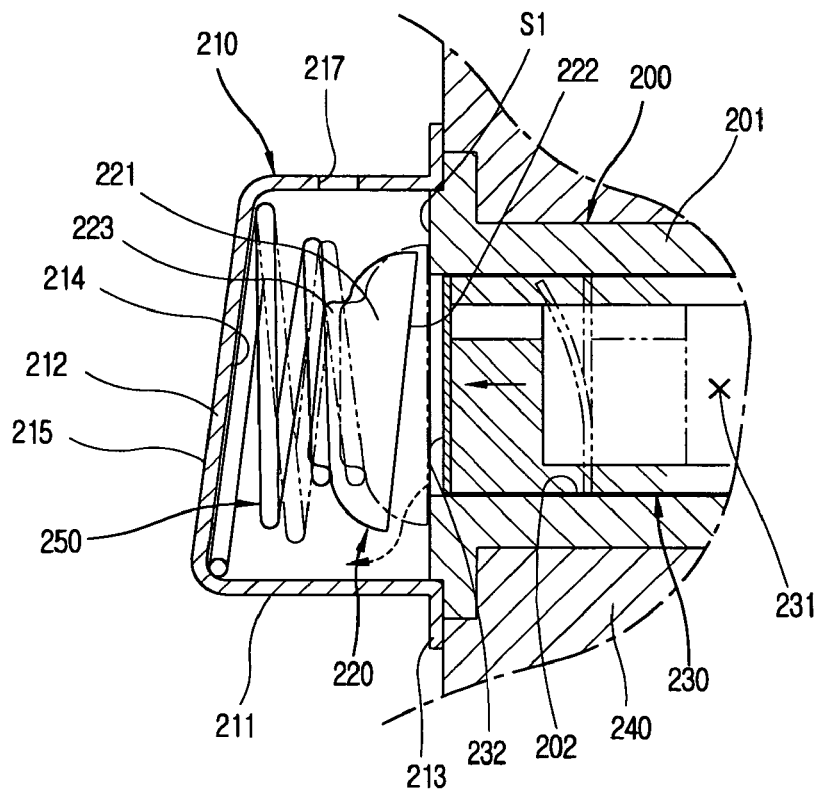

As shown in FIG. 9, when the piston 230 is moved from the bottom dead point to the upper dead point, the suction valve 232 closes the gas channel of the piston 230, and thus gas sucked into the inner space of the cylinder 200 is gradually compressed. At this time, when the gas is in a predetermined compression state, the discharging valve 220 supported by the valve spring 250, is opened, and thus the compressed gas is discharged. At this time, since unbalanced pressure is applied to the discharging valve 220 by the valve spring 250 and constant gas pressure is applied to the compression plane 222 of the discharging valve, the point of time for opening is quickened at a portion of the discharging valve to which a low spring force is applied. Through these operations, a large amount of gas can be discharged rapidly.

And then, when the piston 230 is moved from the upper dead point to the bottom dead point again, the discharging valve 220, which has been opened by the pressure difference at the inner space of the cylinder 200, and by the spring force of the valve spring 25, is adhered to the contact surface S1 of the cylinder, and thus closes the inner space of the cylinder 200. At this time, a portion of the discharging valve 220 to which a greater spring force is applied, comes in contact with the contact surface S1 of the cylinder first by the unbalanced spring force caused by the valve spring 250. In this manner, the compression plane 222 of the discharging valve is adhered to the contact surface S1 of the cylinder. For this reason, when the discharging valve 220 closes the inner space of the cylinder, impulse between the discharging valve 220 and the cylinder 200 is relieved.

While process described above is continuously repeated, gas can be sucked, compressed and discharged.

Figure 10:
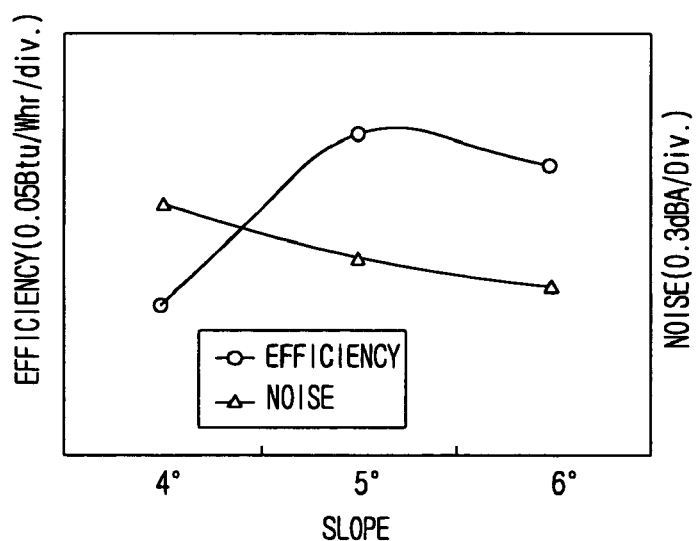
FIG. 10 is a graph showing noise and discharging efficiency according to a sloping angle constructing a discharging valve assembly for a reciprocating compressor according to the present invention.
Figure 11:
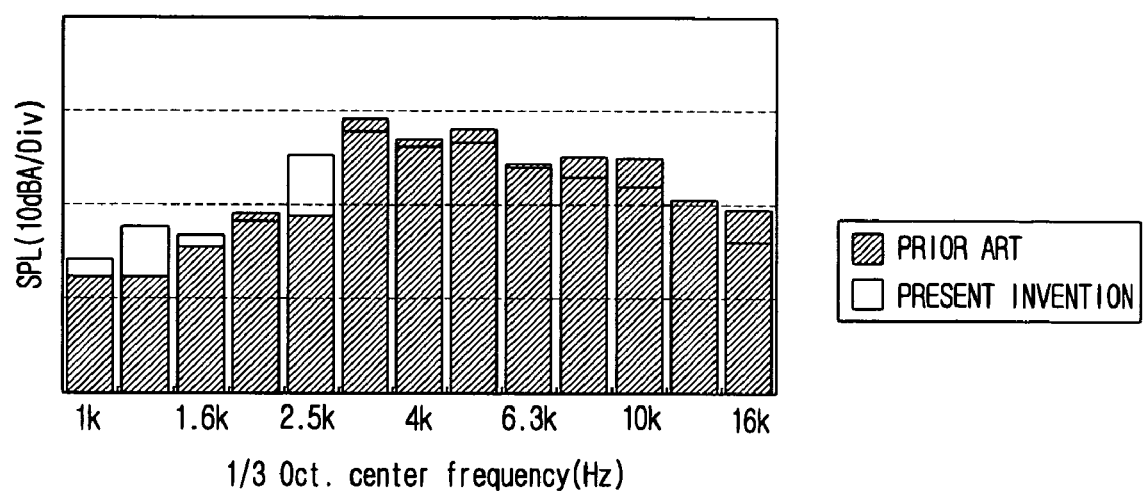
FIG. 11 is a graph showing a result of comparing noise of a discharging valve assembly for a conventional reciprocating compressor and that of a discharging valve assembly for a reciprocating compressor according to the present invention

FIG. 10 is a graph showing change of noise and discharging efficiency according to a sloping angle of a sloping surface of a discharging cover and that of a discharging valve. As shown therein, discharging efficiency is the highest at five degrees of a sloping angle, and noise becomes smaller as the sloping angle becomes bigger. FIG. 11 is a graph showing a noise generation of a discharging valve assembly for a conventional reciprocating compressor and that of a discharging valve assembly for a reciprocating compressor.

As so far described, in a discharging valve assembly for a reciprocating compressor, a spring force elastically and unbalancedly supporting a discharging valve is applied to the discharging valve 220. So, impulse between the discharging valve 220 and the cylinder 200 is reduced when the discharging valve 220 opens/closes the inner space of the cylinder 200 by a pressure difference generated by a reciprocating movement of the piston 230. Thusly, noise generated by contact of the discharging valve 220 and the cylinder is reduced so that reliability can be improved. In addition, the compressed gas is discharged rapidly and smoothly so that discharging efficiency can be improved according to an increase in discharge amount of gas.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A discharging valve assembly for a reciprocating compressor comprising:
 a discharging cover coupled with a front frame so as to cover a cylinder in which a piston is inserted;
 a discharging valve inserted in the discharging cover, and opening/closing an inner space of the cylinder where gas is compressed; and
 an unbalancedly and elastically supporting means elastically supporting the discharging valve so that contact pressure applied to the discharging valve when the valve comes in contact with the contact surface of the cylinder, is unbalanced;
 wherein the unbalancedly and elastically supporting means comprises a valve spring whose one side is fixedly coupled with the discharging valve, and whose other side is contactedly supported by an inner side surface of the discharging cover, and a sloping surface of the discharging cover by which the valve spring is supported; and
 wherein outer surface of the sloping surface of the discharging cover slopes in response to the sloping surface, and a thickness of a wall formed by the sloping surface of the discharging cover and the outer surface thereof is constant.

2. The discharging valve assembly of claim 1, wherein the valve spring has a different number of spring windings at both sides from its center.

3. A discharging valve assembly for a reciprocating compressor comprising:
 a discharging cover coupled with a front frame so as to cover a cylinder in which a piston is inserted;

a discharging valve inserted in the discharging cover, and opening/closing an inner space of the cylinder where gas is compressed; and an unbalancedly and elastically supporting means elastically supporting the discharging valve so that contact pressure applied to the discharging valve when the discharging valve comes in contact with the contact surface of the cylinder, is unbalanced;

wherein the unbalancedly and elastically supporting means comprises a valve spring whose one side is fixedly coupled with the discharging valve, and whose other side is contactedly supported by an inner side surface of the discharging cover, and a sloping surface of the discharging cover by which the valve spring is supported; and the valve spring has different elastic stiffness at both sides from its center, wherein the different elastic stiffness of the valve spring at both sides from its center is provided by a different number of spring windings at both sides from its center.

4. A discharging valve assembly for a reciprocating compressor comprising:

a discharging cover coupled with a front frame so as to cover a cylinder in which a piston is inserted;

a discharging valve inserted in the discharging cover, and opening/closing an inner space of the cylinder where gas is compressed; and an unbalancedly and elastically supporting means elastically supporting the discharging valve so that contact pressure applied to the discharging valve when the valve comes in contact with the contact surface of the cylinder, is unbalanced;

wherein the unbalancedly and elastically supporting means comprises a valve spring whose one side is fixedly coupled with the discharging valve, and whose other side is contactedly supported by an inner side surface of the discharging cover, and a sloping surface of the discharging cover by which the valve spring is supported; and wherein the sloping surface of the discharging cover slopes on the basis of a contact surface of the cylinder with which the discharging valve is in contact; and a side of a valve spring with greater elastic stiffness is positioned at a sloping surface side having a nearest distance from the contact surface of the cylinder, wherein the greater elastic stiffness at one side of the valve spring is provided by a different number of spring windings at both sides from its center.

5. A discharging valve assembly for a reciprocating compressor comprising:

a discharging cover coupled with a front frame so as to cover a cylinder in which a piston is inserted;

a discharging valve inserted in the discharging cover, and opening/closing an inner space of the cylinder where gas is compressed; and an unbalancedly and elastically supporting means elastically supporting the discharging valve so that contact pressure applied to the discharging valve when the valve comes in contact with the contact surface of the cylinder, is unbalanced;

wherein the unbalancedly and elastically supporting means comprises a valve spring whose one side is fixedly coupled with the discharging valve, and whose other side is contactedly supported by an inner side surface of the discharging cover, wherein the discharging valve has a compression plane on one side thereof for contacting the cylinder and a sloping surface located on the opposite side thereof by which the valve spring is supported, and wherein the valve spring has a different number of spring windings at both sides from its center.

* * * * *